Oct. 21, 1969  H. AULER ETAL  3,473,790
AERATION APPARATUS

Filed Nov. 16, 1967  2 Sheets-Sheet 1

INVENTOR.
HERBERT AULER.
JOSEF MUSKAT.
BY Gerald A. Mathews
Agent

Oct. 21, 1969     H. AULER ETAL     3,473,790
AERATION APPARATUS
Filed Nov. 16, 1967                         2 Sheets-Sheet 2

INVENTOR.
HERBERT AULER.
JOSEF MUSKAT.
BY Gerald A. Mather Agent

United States Patent Office 3,473,790
Patented Oct. 21, 1969

3,473,790
AERATION APPARATUS
Herbert Auler and Josef Muskat, Michelbach, Nassau, Germany, assignors to Passavant-Werke, Michelbacher-hutte, near Michelbach, Germany, a corporation of Germany
Filed Nov. 16, 1967, Ser. No. 683,547
Claims priority, application Germany, Nov. 21, 1966, P 40,838
Int. Cl. B01d 47/16
U.S. Cl. 261—91                                  13 Claims

ABSTRACT OF THE DISCLOSURE

Apparatus for introducing gas into a liquid by rotating a bladed agitator horizontally on the liquid surface to impel droplets upwardly through the gas and against a baffle which directs the droplets and entrained gas back downward under the liquid surface.

BACKGROUND OF THE INVENTION

This invention relates generally to the subject of introducing gases into liquids and, more particularly, to equipment for aerating waste water such as sewage.

Prior methods and apparatus for aerating waste water can roughly be divided into two classes. The first class includes stationary devices such as oxygenation tubes which are placed on or near the bottom of a tank containing waste water. Air is pumped into the tubes, in which many openings are located, to percolate upwardly through the liquid. The second class includes mechanical aerators which, heretofore, have generally taken the form of a horizontal shaft on which a plurality of blades are attached. The shaft and blades rotate and beat oxygen into the liquid.

The percolation type of apparatus is immobile within the tank and requires a great deal of plumbing in the form of pipes, compressors and pump capacity. The horizontal rotors, it has been found, are more efficient when they have large diameters and long lengths. They also have an inherent problem with corrosion because the couplings and bearings are mounted very close to, if not actually in, the waste water in order to allow the rotor blades to dip into a significant depth. If rather sturdy equipment is not provided to allow the rotor to move vertically, it is difficult to control the depth of blade immersion which influences the degree of aeration.

Neither the percolating apparatus nor the large aeration rotors, once designed and installed, are particularly adaptable to being moved into another tank of a different size and capacity. They become, in effect, custom machinery designed for a particular tank size and capacity.

SUMMARY

The present invention provides more flexible aeration apparatus. A bladed aeration wheel is mounted to a vertical shaft to rotate in a horizontal plane. The penetration of the entire wheel into the liquid is vertically adjustable. This allows variation in the amount of liquid impelled by the wheel and also its height, lateral distance and force.

The bladed wheel is used in conjunction with a baffle which usually extends completely around the wheel. The baffle is mounted horizontally and has had portions extending above and below the liquid surface. The location of the baffle with respect to the center of the wheel shaft and the nearest tank wall is a function of the wheel radius and is also influenced by the wheel's speed and immersion depth.

The wheel impels liquid droplets laterally above the surface and upwardly through the gas which, in most cases, is air. The baffle intercepts this flow and directs the liquid containing entrained gas back downwardly beneath the liquid surface. The ratio of the radial distance of the baffle from the center of the shaft to the wheel radius, and the angle at which the upper portion is inclined to intercept the liquid flow, are important in determining the amount of liquid containing small bubbles which is returned to the main body of liquid.

Small bubbles are especially desirable for aerating waste water because of the relative ease in which they can be projected beneath the liquid surface and the large surface area they present in proportion to the volume of entrained gas.

The problem of protecting bearings and motors from corrosion has been minimized with this invention because only the shaft and bladed aeration wheel are in close proximity to the liquid; bearings and other support apparatus can be positioned as far above the liquid surface as desired. In fact, the entire wheel is always in contact with the liquid thereby ensuring that all power applied to the shaft is transmitted to the liquid.

The vertical mounting arrangement also contemplates a system wherein one or more of the wheel baffle combinations can be moved along the liquid surface by suspending the driving motor from a traveling movable support. This allows more liquid to be reached by the aeration wheel sooner than would happen if natural circulation within the tank is relied upon to bring the liquid into contact with the aeration wheel. No efficiency in operation is lost because the baffle can be mounted to travel with each wheel.

Accordingly, it is the object of this invention to provide apparatus to produce a large proportion of small bubbles of gas and to project these bubbles into a liquid to be assimilated therein.

Another object of this invention is to provide apparatus which can efficiently introduce gas into a liquid while either moving through the liquid or remaining stationary.

Still another object of this invention is to provide apparatus to introduce a gas into a fluid which can be efficiently adapted to fluid tanks of different sizes and configurations.

A feature of this invention is the provision of baffle whose size and shape can be altered to intercept and guide variable proportions of liquid containing entrained gas from the impelling wheel back into the liquid.

Still other features, objects and advantages of this invention will be discerned by those skilled in the art when this disclosure is read in conjunction with the accompanying drawings.

DESCRIPTION OF THE PREFERRED EMBODIMENTS

Figure 1:
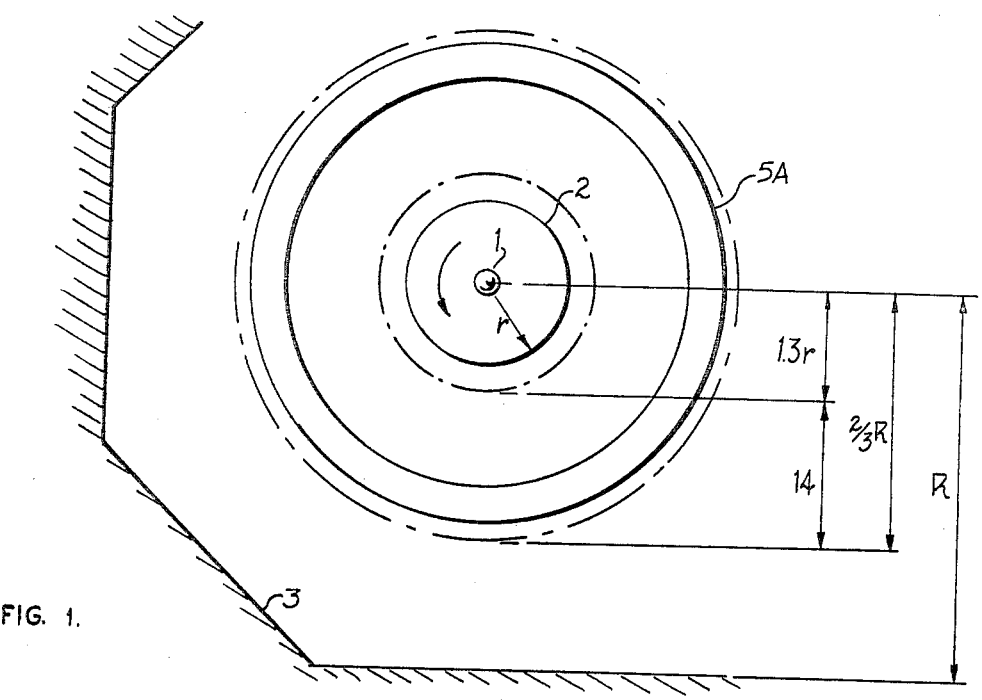
FIGURE 1 shows a top plan view of the rotor wheel, circular baffle and vessel wall.

FIGURE 1 shows a top view of a bladed aeration wheel 2 mounted on a shaft 1 around which a circular baffle 5A is mounted concentrically. This whole apparatus is mounted within a tank containing waste water, near the inner wall 3 thereof.

It can be readily appreciated that the compact configuration of the aeration wheel-baffle arrangement is especially adaptable to tanks having unusual configurations or narrow portions, the size of which, in the case of new construction or additions to existing plants, is often dictated by the size and shape of the property available. It is also contemplated that the entire wheel-baffle arrangement can be moved laterally within the tank so that a current within the tank is not necessary in order to make the aeration wheel accessible to all the liquid. This feature can be used to speed the time necessary to aerate the liquid to the degree desired. One or more of these aeration rotors can be movably mounted on a frame above the tank and guided so that they will sweep substantially all of the surface area within the time of a given cycle. Whether the aeration wheel is intended for movement along the liquid surface or not, the baffle surrounding it can be made to be radially adjustable so that its circumference can be increased or decreased to intercept variable amounts of liquid impelled by the wheel.

It has been found that the most optimum results are obtained when the baffle 5A is positioned neither extremely close to, or far from, the aeration rotor wheel 2. Baffle 5A forms the effective outer boundry for each aeration wheel. For this reason it is neither particularly desirable nor necessary to position the aeration wheel 2 near the tank side wall 3 to improve results. The range 14 within which the baffle is located radially from the rotor shaft 1 should be from about 1.3 times the radius of aeration wheel 2 to about ⅔ the distance of the center of shaft 1 to the nearest side wall 3.

Other factors, such as the torque applied to aeration wheel 2 and the inclination of baffle 5A from the plane of the liquid surface, influence the distance baffle 5A is located from shaft 1 in a given installation. This will be discusesed in more detail below.

Figure 2:
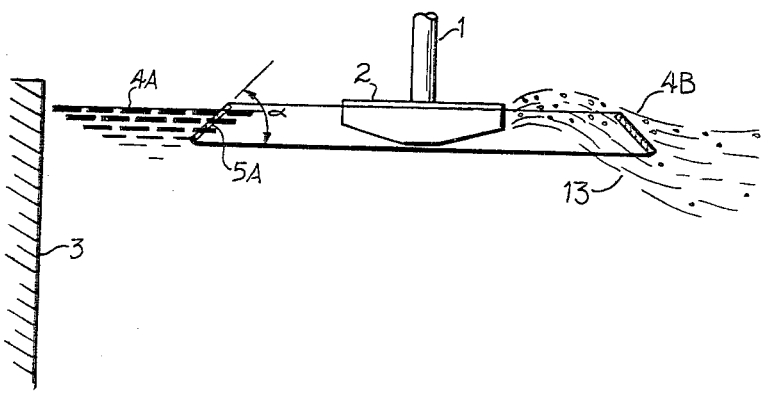
FIGURE 2 is a side elevational view partially in section of the apparatus in FIGURE 1.

FIGURE 2 shows the circular baffle in FIGURE 1 in vertical secton. As aeration wheel 2 rotates, air is introduced into quiescent liquid 4A and the mixture is impelled radially upwardly and outwardly against the baffle 5A. The curved path of the flow can be divided into components 4B, which contains large bubbles, and 13, which contains small air bubbles. Large air bubbles are not especially desirable because of their relatively greater resistance to being projected beneath the liquid surface. On the other hand, smaller bubbles tend to flow along with the liquid back beneath the surface where their aeration ability is more efficient. Baffle 5A is angled upwardly with respect to the horizontal water surface 4A at an angle α such as to intercept the aerated water flow and guide the portion containing large bubbles 4B onto the surface while deflecting the portion containing small bubbles beneath the surface to aerate the water within the tank.

It can be readily seen, in FIGURE 2, that if baffle 5A is moved radially inwardly or outwardly from the shaft 1 its ability to intercept and separate the flow portion 4B, containing the large bubbles, from the desired portion 13 containing small air bubbles, will be greatly diminished. Also, it can be seen that angle α is increased, the baffle 5A will intercept the greater percentage of the entire radial flow and the efficiency of the aeration wheel in projecting the aerated flow beneath the surface will be decreased. If the baffle 5A is located too close to side wall 3, the ability of the aeration wheel 2 to disseminate the aerated flow is impaired because the wall prevents the free circuation of the water outwardly from baffle 5A and inwardly up to wheel 2.

Figure 3:
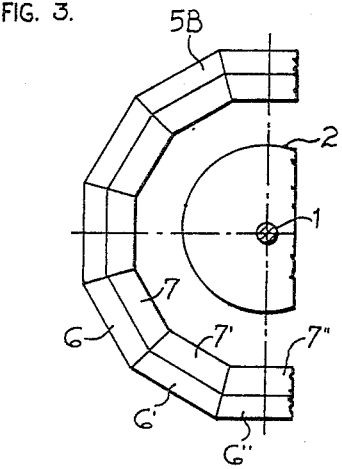
FIGURE 3 shows a top plan view of a polygon shaped baffle.
Figure 4:
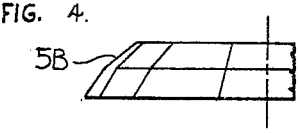
FIGURE 4 is a side view in section of the apparatus shown in FIGURE 3.

FIGURES 3 and 4 show a modified version of a baffle plate. A plurality of individual plates 6, 6', 6" and 7, 7', 7" is connected together to form a polygon-shaped baffle 5B around aeration wheel 2. The upper plates 7, 7', 7" are connected to the correspondingly numbered lower plates along a continuous horizontal annular line about wheel 2. By dividing baffle 5B into annular upper and lower portions, it is possible for the upper portion to effect greater control over the collection of aerated water while the lower portion, being angled more vertically with respect to the horizontal, provides a surface better adapted to projecting the aerated liquid beneath the surface.

Figure 5:
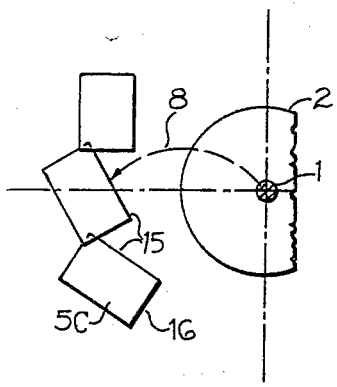
FIGURE 5 is a top plan view of a baffle comprised of individual sections.

The aerated water flow from wheel 2 may be broken down into two components. As mentioned above, the radial component takes the form of an arched curve extending from the shaft 1 upwardly, outwardly and then downwardly toward the water surface. The second component is along a line tangent to the bladed wheel diameter circle 2. The resultant of these radial and tangential components is a curved line 8 shown in FIGURE 5. In order to intercept and deflect the most desired portion of the aerated flow containing the small bubbles, the baffle should present a leading edge and surface perpendicular to the resultant flow component at the point where it contacts the baffle. As shown in FIGURE 5, the baffle is made up of a series of individual plates 5C which extend completely around aeration wheel 2. Breaking the baffle into individual plates allows them to be positioned so that their leading edge 15 is more nearly perpendicular to the path of aerated water coming from wheel 2. This also allows them to be overlapping to provide a larger surface area to intercept and downwardly direct the aerated liquid flow.

Also, by making the baffle out of a series of individual plates, a greater degree of flexibility can be achieved by mounting each of the plates 5C in a manner so as to be movable. Accordingly, each plate 5C can be mounted to rotate about either its leading edge 15 or side edge 16, or both, which are at right angles to each other. Edges 16, therefore, overlap along lines tangent to the diameter circle of wheel 2. Leading edge 15 is positioned so as to be as perpendicular to the resultant flow component 8 as possible. This ensures that the aerated flow it intercepts will be directly substantially downwardly below the surface rather than sideways and onto quiescent surface 4A. It is noteworthy that when the leading edge 15 and plate 5C are both substantially at right angles to the aerated liquid flow, the water line on plate 5C is also perpendicular to the flow.

It is contemplated that in some instances, such as when the liquid comprises a particularly thick substance such as industrial waste, the plates of the baffle ring can be locked into a desired position and the whole ring rotated counter to the direction of aeration wheel rotation to facilitate the injection of small bubbles beneath the liquid surface.

Figure 6:
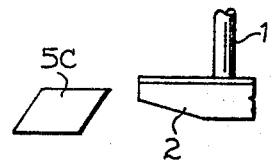
FIGURE 6 is a side elevational view of the apparatus shown in FIGURE 5.

FIGURE 6 shows a side elevation view of an individual baffle plate 5C shown in FIGURE 5. Whether the baffle is constructed of individual plates or is made of one continuous piece, it can be bent in the form of a smooth curve as seen along a vertical cross section (not shown in the drawings). The curve would ordinarily be concave on the inner side of the baffle toward the aeration wheel 2, but under some circumstances is conceivable that a convex surface on the inner side toward the aeration wheel might provide superior results.

Figure 7:
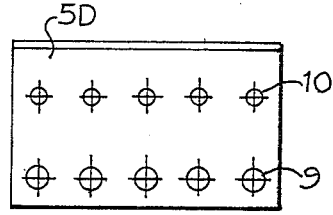
FIGURE 7 shows a front elevational view of an individual baffle plate having circular openings.
Figure 8:
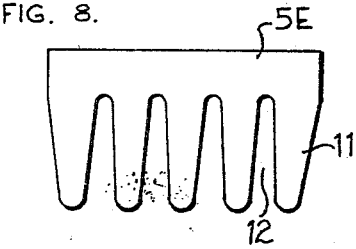
FIGURE 8 is another front elevational view of an individual baffle plate having comb-like openings.

FIGURES 7 and 8 show individual baffle plates 5D and 5E, respectfully, in which openings have been made to encourage the formation of small bubbles at or near the water surface. These small bubbles are then driven beneath the surface by the oncoming flow from wheel 2. In FIGURE 7, circular openings 9 and 10 perform this function while in FIGURE 8, it is done by spacings 12 between teeth 11.

All of the baffle embodiments discussed so far have described the baffle as being concentric with the aeration wheel 2 and shaft 1. Now, while this is the preferred arrangement, it is contemplated that due to unusual tank configuration or flow pattern within the tank, an eccentrically mounted baffle, with respect to shaft 1, might be desired. In the event that this eccentrically mounted baffle would be comprised of individual plates, the feature of individually controlling and positioning the plates would be especially desirable.

Thus it will be seen that an improved aeration apparatus has been provided which meets the objectives and incorporates the features set forth.

While a specific embodiment of the applicant of this invention has been described, as to be understood this invention can be used to aerate or introduce gas into various other liquid besides waste water. Furthermore, it should also be understood that various changes and modifications can be made without departing from the spirit and scope of the principles taught by this invention.

Having thus described the invention, what is claimed is:

1. Apparatus for introducing a gas into a liquid comprising, in combination; a vertical shaft mounted above the liquid surface, a bladed wheel mounted on said shaft for rotation therewith about a vertical axis and partially immersed below the surface of the liquid, said bladed wheel including means for introducing gas bubbles into the liquid as the bladed wheel rotates, wherein the body of liquid in the vicinity of the liquid surface and having the air bubbles introduced therein, is caused to flow outwardly from the bladed wheel, power means for rotating the shaft and hence for rotating the bladed wheel, and a baffle means mounted in a ring about and spaced horizontally from said bladed wheel, said baffle means extending downwardly and radially outwardly relative to the said shaft, from an upper portion extending above the normal quiescent level of the water, to a lower level extending below the normal quiescent level of the water, the height and positioning of the upper portion above the surface being such that at least a part of the liquid directed outwardly by the bladed wheel is received and divided by the upper edge of said upper portion, the baffle means comprising at least one baffle plate and being sufficiently solid and free of large apertures such that the baffle means deflects downwardly a major part of the body liquid caused to flow outwardly to the ring of baffle means by the said bladed wheel.

2. Apparatus as set forth in claim 1 wherein:
said baffle means is curved so as to have a concave surface facing the wheel.

3. Apparatus as set forth in claim 1, wherein:
said baffle means is comprised of a plurality of plates attached together to form a polygon shaped baffle completely around the wheel as viewed from above along the shaft axis.

4. Apparatus as set forth in claim 3, wherein:
each of said plates is bent horizontally to form concave and convex sides and is positioned to present the concave side toward the wheel.

5. Apparatus as set forth in claim 1, wherein:
said baffle means comprises a plurality of individual plates, each having a leading edge and mounted in a uniformly arrayed position with respect to the other plates to form a circle around the wheel.

6. Apparatus as set forth in claim 5, wherein:
said baffle plates are pivotable so as to be able to alter their position and surface area on which the liquid impelled by the wheel impinges.

7. Apparatus as set forth in claim 5, wherein:
said circle of baffle plates is eccentrically mounted about the wheel.

8. Apparatus as set forth in claim 7, wherein:
each of said baffle plates is individually pivotable to allow them to present their leading edges substantially perpendicular to the resultant of the tangential and radial components of the liquid flow from the wheel.

9. Apparatus for introducing a gas into a liquid contained in a walled vessel comprising; a bladed wheel mounted on a vertical shaft and disposed to contact the liquid surface; power means connected to the shaft to rotate the wheel; baffle plates mounted at the surface of the liquid spaced from,
and extending at least partially about, the wheel and having an upper portion extending above and a lower portion extending below the liquid surface,
said baffle plates being attached together so that corresponding edges overlap substantially along lines tangent to the wheel diameter.

10. Apparatus as set forth in claim 9, wherein:
each said baffle plate contains openings to intercept and diffuse the liquid flow to encourage the formation of small bubbles.

11. Apparatus as set forth in claim 9, wherein:
said baffle means is spaced from the center of the shaft a distance of about 1.3 times the wheel radius and about 2/3 times the distance from the shaft center to the nearest wall of the vessel.

12. Apparatus as set forth in claim 11, wherein:
said baffle means comprises a plurality of plates arranged annularly around the wheel, each plate having a leading edge extending above the liquid level inclined toward the wheel and positioned so that the water line and leading edge are substantially perpendicular to the resultant of the tangential and radial components of liquid flow from the wheel.

13. Apparatus as set forth in claim 12, wherein:
said baffle plates are attached together to form a continuous ring;
power means is connected to said ring to rotate it about the wheel.

References Cited

UNITED STATES PATENTS

| | | | |
|---|---|---|---|
| 1,764,498 | 6/1930 | Beers | 259—96 |
| 2,787,447 | 4/1957 | Crawford | 259—96 X |
| 3,208,734 | 9/1965 | Wood et al. | 261—91 X |
| 3,323,782 | 6/1967 | Clough | 261—91 X |
| 3,341,450 | 9/1967 | Ciabattari et al. | 261—91 X |

FOREIGN PATENTS

| | | |
|---|---|---|
| 244,444 | 10/1962 | Australia. |
| 1,205,301 | 4/1959 | France. |

TIM R. MILES, Primary Examiner

U.S. Cl. X.R.
210—219; 259—96